(12) United States Patent
Kraft, IV

(10) Patent No.: US 6,880,107 B1
(45) Date of Patent: Apr. 12, 2005

(54) SOFTWARE CONFIGURATION MONITOR

(75) Inventor: George Kraft, IV, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 09/363,948

(22) Filed: Jul. 29, 1999

(51) Int. Cl.[7] .............................................. G06F 11/00
(52) U.S. Cl. ................... 714/36; 714/15; 713/2
(58) Field of Search .......................... 714/36, 15; 713/2

(56) References Cited

U.S. PATENT DOCUMENTS

| | | | | |
|---|---|---|---|---|
| 5,410,699 A | * | 4/1995 | Bealkowski et al. | 340/5.74 |
| 5,537,540 A | * | 7/1996 | Miller et al. | 714/36 |
| 5,974,574 A | * | 10/1999 | Lennie et al. | 714/52 |
| 6,047,373 A | * | 4/2000 | Hall et al. | 713/1 |
| 6,263,348 B1 | * | 7/2001 | Kathrow et al. | 707/203 |
| 6,282,640 B1 | * | 8/2001 | Klein | 710/104 |

OTHER PUBLICATIONS

Norton et al., Peter Norton's Complete Guide to Norton SystemWorks 2.0, 1999, Chapters 7 and 15.*

* cited by examiner

Primary Examiner—Robert Beausoliel
Assistant Examiner—Michael Maskulinski
(74) Attorney, Agent, or Firm—Joseph P. Lally; Dan McConnell

(57) ABSTRACT

A system and method for monitoring the software configuration of a computer system. As a preliminary step in an error recovery procedure initiated in response to detecting a system error condition, it is determined whether one or more configuration files on the system are in an unauthorized state. If so, one embodiment of the invention contemplates suspending the error recovery procedure until the configuration file has been restored to an authorized. In one embodiment, the determination of whether a configuration file is in an unauthorized state is facilitated by associating a configuration file fingerprint with the configuration file where the fingerprint is indicative of the contents of the configuration file. In this embodiment, the contents of the configuration file can be verified against the fingerprint to determine if any unwarranted or unauthorized modifications have been made to the configuration since the fingerprint was generated. Preferably, an authorized editing or modification tool is provided for modifying the configuration file. The authorized tool updates the fingerprint upon modifying the configuration file to reflect the modified contents of the configuration file. In this manner, modifications made to the configuration file using the authorized tool are distinguishable from modifications that are made without using the authorized tool. In one embodiment, the process of associating the fingerprint with the configuration file comprises determining a signature code for the configuration file based on the contents of the configuration file. In various embodiments, a suitable signature code might be generated an MD5, CRC, SHA, or other suitable checksum generation algorithm.

20 Claims, 3 Drawing Sheets

SOFTWARE CONFIGURATION MONITOR

BACKGROUND

1. Field of the Present Invention

The present invention generally relates to field of computer systems and more particularly to maintaining the integrity of computer system software configuration files.

2. History of Related Art

Although a large number of computer systems share a common processor architecture or a common operating system, a great detail of variation exists in the way computer systems are implemented by various manufacturers and even by a single manufacturer. These minor and sometimes less than minor variations present a source of considerable challenge for field service engineering personnel when they are required to determine the source of a non-functional or less than fully functional system. The task is frequently made still more complicated and difficult by the presence of configuration files that are easily altered by users with a casual knowledge of the system. Configuration files provide a mechanism by which system and application program parameters may be altered to enable users to customize their machines. By altering configuration files, two computer system that contain essentially identical hardware can be made to behave in different fashions. The format, syntax, and content of configuration files are typically required to conform to a rigid specification. If the configuration files are edited or modified in a manner that leaves the files in a state that is not consistent with the specified format, an application program or an entire system may cease to function in the desired manner. When a system fails, the customer is likely to request the assistance of a field service engineer from the manufacturer of the system. If the source of the problem cannot be easily determined remotely, the field service personnel are then typically required to visit the customer's location to analyze the source of the problem. The field service engineer will frequently be equipped with standardized diagnostic system software that checks the various components of the system for functionality. These diagnostic programs are typically directed primarily at verifying the functionality and configuration of the system's hardware components since no diagnostic routine can be expected to anticipate the virtually endless permutations of software configurations that may be possible for a given system. Thus, when a system crash or other failure is caused by an improperly modified configuration file, a routine field service visit may not be sufficient to remedy the problem. If this is the case, the system must then be diagnosed by one or more persons with a more intimate knowledge of the system's software and configuration settings. Thus, it is not uncommon for a computer system manufacturer to spend more time servicing and maintaining a system that has been improperly modified by the system's user or users than it spends servicing a system with a detectable hardware problem. Accordingly, it would be highly desirable to implement a method and mechanism by which unauthorized modifications of configuration files are easily detected to insure that a field servicing event is not initiated until the software configuration of the computer system has been verified. It would be further desirable if the method of verifying the software configuration was implemented with a minim impact on existing software and hardware and without significantly increasing the cost or complexity of the computer system.

SUMMARY OF THE INVENTION

The problems identified above are in large part addressed by method for efficiently verifying the software configuration settings of the computer system as a preliminary step in an system servicing or maintenance procedure. Only after the format and content of the system's software configuration files are verified is a field service event initiated. In this manner, the manufacturer is assured of utilizing scarce field service personnel for systems that have no known software configuration problems thus saving both the customer and manufacturer the time and effort that is expended trying to track down the source of problems caused by improperly modified configuration files.

Broadly speaking, the invention contemplates a system and method for monitoring the software configuration of a computer system as part of a field service maintenance strategy to detect the presence of unwarranted or unauthorized configuration file modifications on the system. As a preliminary step in a maintenance, field service, or other error recovery procedure initiated in response to detecting a system error condition, it is determined whether one or more configuration files on the system are in an unauthorized state. If it is determined that a configuration file is in an unauthorized state, one embodiment of the invention contemplates suspending the error recovery procedure until the configuration file has been restored to an authorized state.

In one embodiment, the determination of whether a configuration file is in an unauthorized state is facilitated by associating a configuration file fingerprint with the configuration file where the fingerprint is indicative of the contents of the configuration file. In this embodiment, the contents of the configuration file can be verified against the fingerprint to determine if any unwarranted or unauthorized modifications have been made to the configuration since the fingerprint was generated. Preferably, an authorized editing or modification tool is provided for modifying the configuration file. The authorized tool updates the fingerprint upon modifying the configuration file to reflect the modified contents of the configuration file. In this manner, modifications made to the configuration file using the authorized tool are distinguishable from modifications that are made without using the authorized tool. Thus, the invention can enforce the use of the authorized modification tool to insure that the configuration files are maintained with appropriate format, syntax, and parameter values.

In one embodiment, the process of associating the fingerprint with the configuration file comprises determining a signature code for the configuration file based on the contents of the configuration file. In various embodiments, a suitable signature code might be generated using an MD5, CRC, SHA, or other suitable checksum generation algorithm. The configuration file itself may be a system configuration file associated with the computer system's operating system software or an application configuration file that is associated with an application program of the system. In the preferred embodiment, a configuration monitor module in the form of a set of computer instructions is responsible for determining whether the configuration file is in an authorized state. Preferably, the configuration monitor is invoked in response to detecting the error condition and includes a catalogue of each configuration file of the computer system. The monitor is adapted to verify the authorized state of each configuration file listed in its catalogue.

BRIEF DESCRIPTION OF THE DRAWINGS

Other objects and advantages of the invention will become apparent upon reading the following detailed description and upon reference to the accompanying drawings in which.

Figure 1:
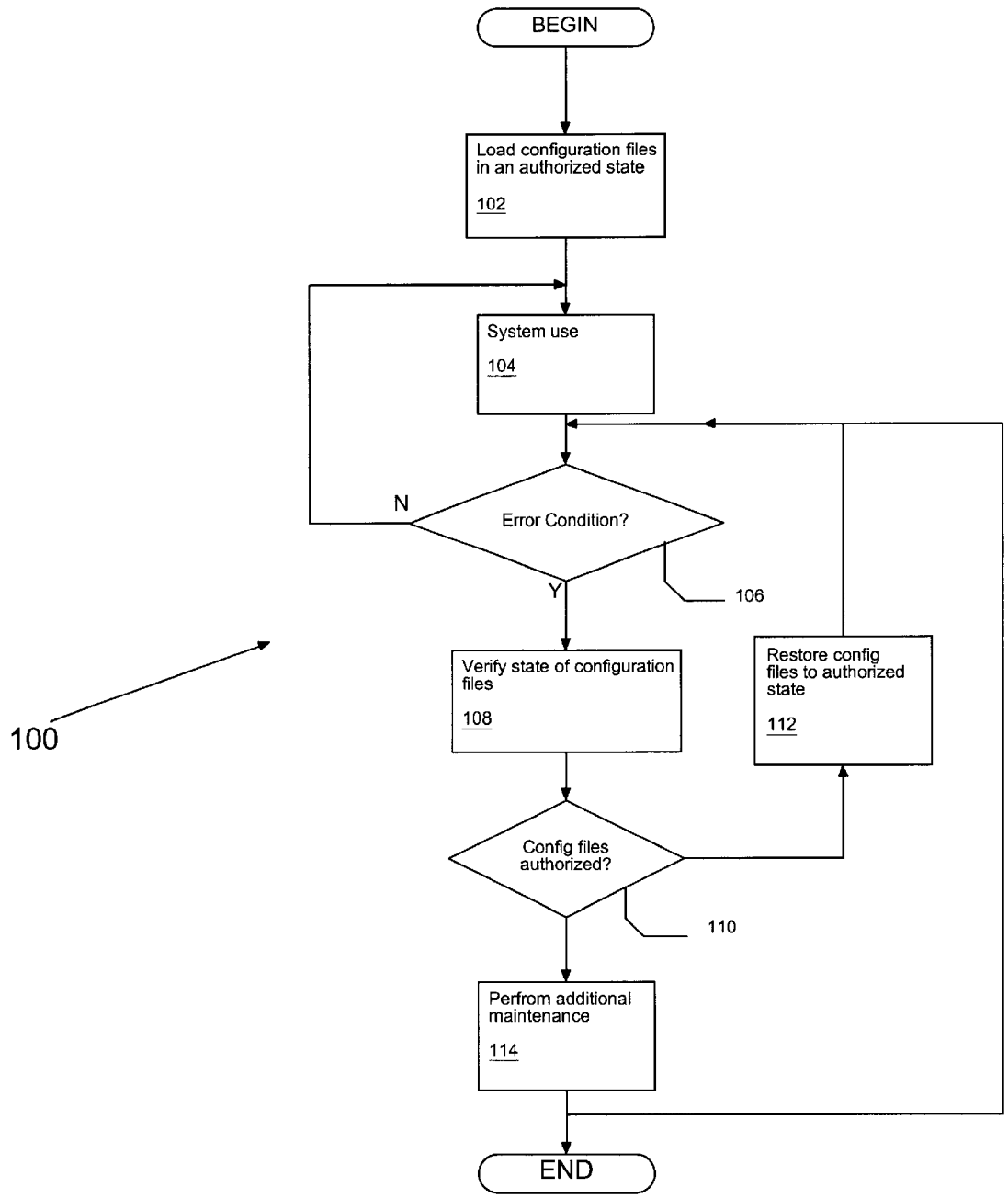
FIG. 1 is flow diagram of a method of monitoring the software configuration of a computer system according to one embodiment of the invention.

While the invention is amenable to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE INVENTION

Insuring that the integrity of the software configuration files on a computer system is a useful preliminary step as part of a service or maintenance strategy. When a system user reports an error condition with a computer system, any number of problems may exist including problems caused by the system's software configuration files. A computer system may include multiple configuration files and the content and format of the configuration files may change with each revision of the operating system or application programs that utilize the configuration files. These configuration files may assume any of an essentially unlimited number of states. In addition, the format, syntax, and content of a configuration file are typically rigidly specified and highly esoteric. Field service engineers cannot be expected to possess intimate knowledge of the structure of each configuration file on a system although they may have a working familiarity with some of the more commonly encountered configuration files.

If the system's configuration files do not conform to the required format, the computer system may interpret the content of the configuration files incorrectly or may be unable to interpret the content at all. When this occurs, the result is frequently a system that is fully or partially inoperable. Moreover, the symptoms that the system exhibits due to an unauthorized configuration file may be indistinguishable from symptoms exhibited by a system that has a detectable hardware problem. Accordingly, the first level response to service such a system typically involves the field service engineer. Thus, if the source of an error or fault condition lies within one or more of the system's configuration files, the field service engineer charged with determining the origin of the fault is placed in the unfortunate position of tracking a problem that is effectively beyond his or her area of expertise. The invention addresses this problem by enabling the efficient verification of the integrity of the system's configuration files.

Turning now to the drawings, FIG. 1 presents a flow diagram of a method 100 according to one embodiment of the present invention suitable for insuring that the software configuration of a computer system has not been impermissibly altered. In a step 102, one or more configuration files are loaded into the system memory of a computer system. The invention contemplates the presence of one or more configuration files on the system and further assumes that, as initially loaded, each configuration file is in an authorized state. For purposes of this disclosure, a configuration file is in an authorized state if the file is initialized, created, and modified by an authorized tool with a proper fingerprint. Step 102 is included in the flow diagram of FIG. 1 for the sake of completeness. It will be appreciated that the loading of the configuration typically occurs when software corresponding to the configuration file is loaded. A first configuration file may be loaded when a first piece of software is loaded while a second configuration file may be loaded when a second piece of software is loaded. The single process step 102 of FIG. 1 is not intended to imply the simultaneous loading of all configuration files. In addition, it will be appreciated by those having the benefit of this disclosure that the process of loading the configuration files is a necessary prerequisite to using the invention disclosed herein but that it is not intended that loading step 102 is necessarily a step of the invention itself.

Method 100 as depicted in FIG. 1 is suitable as a preliminary check in an error recovery procedure initiated in response to detecting an error or fault condition in a computer system. After the appropriate configuration files have been loaded in step 102, general use of the system by one or more users is indicated in step 104. The general system use of step 104 may, include a user making one or more modifications in the system's configuration file. Those familiar with microprocessor based computing systems will appreciate that, when properly used, configuration files provide a valuable mechanism for altering configuration parameters associated with system generally and with application programs as well. Configuration file parameters frequently enable users of the system to customize their system and application software to their particular needs or desires. As an example, an operating system configuration file may include a parameter used to indicate whether the user uses his or her left hand or right hand to manipulate a pointing device such as a mouse. Thus, it is highly desirable to enable users or system managers to alter the settings of configuration file parameters. Providing this flexibility, however, can produce problems if the user of a system modifies a configuration file in a manner such that the file is left in an unauthorized state. Using the previous example, a user who has direct access to the configuration file may alter the "left handed/right handed" parameter to an value that is not recognized by the system (i.e., any value other than "left" or "right"). Similarly, the user with direct access to a configuration file may insert a line or otherwise alter the format of the configuration file such that the program accessing the configuration file is unable to determine the location of the various parameters.

Software developers frequently provide configuration file editing tools to insure that any alterations made to a configuration file do not render the configuration file unusable. Users of commercially distributed operating systems for desktop applications such as IBM's OS/2 operating system will be familiar with the control panel tool that is used to alter system configuration parameters. Additional information regarding the OS/2 operating system is available in *OS/2 Version 2.1 Facts & Features* (Order No. G326-0169-04). Similarly, workstation users may be familiar with the System Maintenance Interface Tool (SMIT) available on systems operating under IBM's AIX operating system. Details of the AIX operating system are described in *AIX General Concepts and Procedure for RISC System*/6000 (Order No. GC23-2202-02). In addition, application programs such as word processors, spreadsheets, data base managers, and a variety of other applications frequently utilize configuration files to enable user customization of the corresponding application. In these instances, the application program typically provides an interface to the configuration file that insures that alterations to the configuration file do not result in a non-compliant configuration file that could produce unpredictable performance of the application or could crash the application entirely. One embodiment of the invention contemplates the presence an authorized configuration file editing tool associated with a corresponding configuration file. The invention contemplates that modifications made to configuration files via these authorized editing tools will result in a modified configuration file that is itself fully authorized.

One embodiment of the invention suitable for use in servicing and maintaining computer systems contemplates that, eventually, the computer system will exhibit an error condition or otherwise cease to function in a desired manner. When the error condition occurs, it is detected in step 106 of the flow diagram of FIG. 1. In response to detecting the error condition and prior to continuing with additional maintenance or field service activity, the configuration files on the system are verified in step 108 to insure that each configuration file is in an authorized state. In the preferred embodiment, the verification of the configuration files is achieved by comparing the contents of the configuration files with corresponding configuration file fingerprints, where the fingerprints are indicative of the configuration file contents as described in greater detail below. If any unauthorized modifications to a particular configuration file have been made, the contents of the configuration file and the contents indicated by the configuration file fingerprint will vary. This discrepancy between the configuration file and the configuration file fingerprint is then detected in step 110. The ability to determine whether the system's configuration files have been improperly modified provides a useful starting point for a field service engineer in determining the origin of a system error condition. The field service engineer can verify or have the user verify the state of the configuration files as a preliminary step in the maintenance process. If the configuration file contains unauthorized modifications, the field service engineer can suspend further maintenance procedures until the configuration files have been restored to an authorized state in step 112. Once the configuration files have been restored to their original or to an otherwise authorized state, the functionality of the system is reassessed. If a problem or error conditions still persists, the field service engineer can continue with additional field service procedures in step 114 until the problem causing the error condition is detected.

Figure 2:
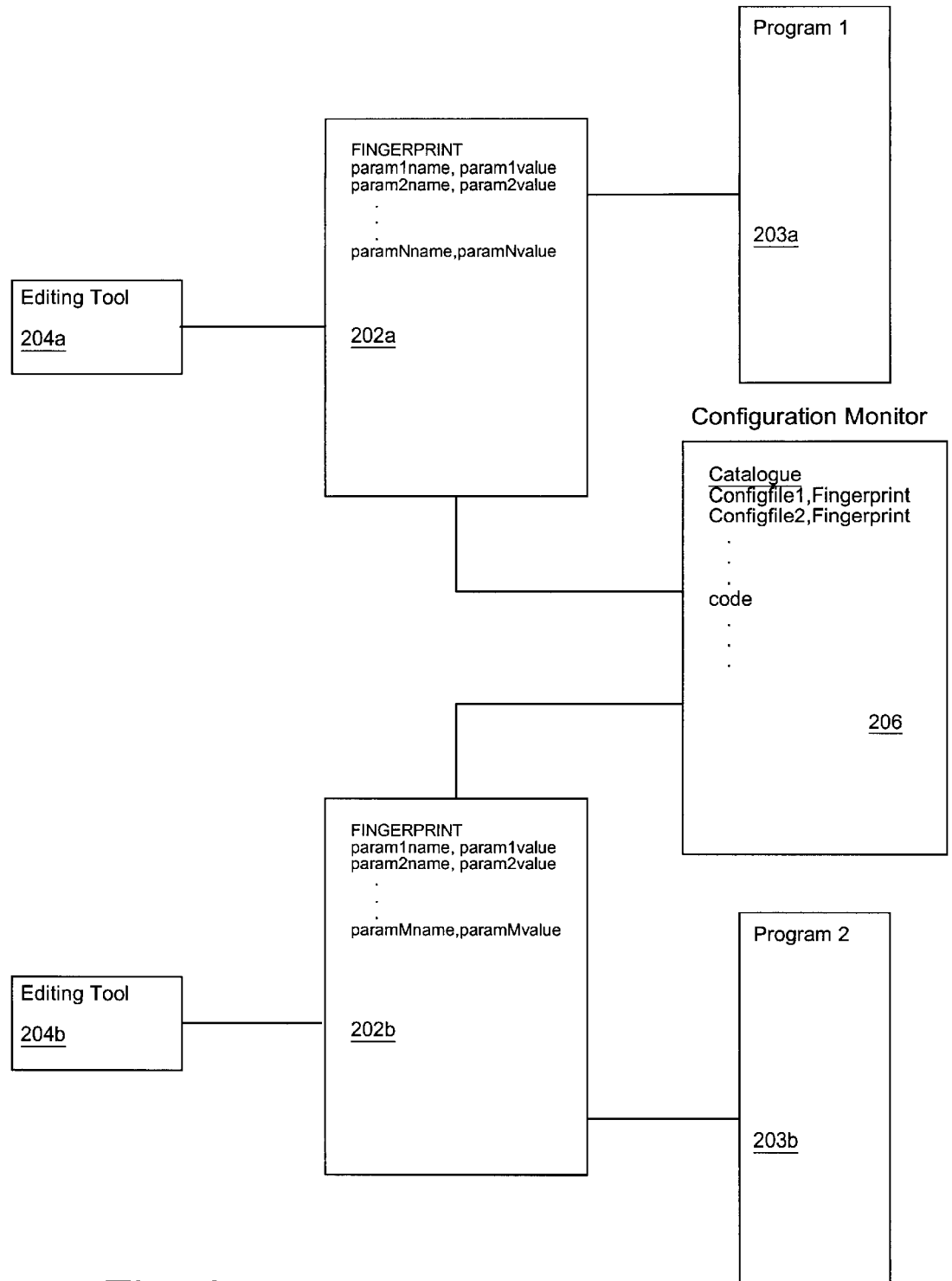
FIG. 2 is a simplified representation of the files maintained by the software configuration monitor according to one embodiment of the present invention.

Turning now to FIG. 2, additional detail with respect to an embodiment of the invention utilizing configuration file fingerprints is depicted. A configuration file fingerprint provides an indicator of the contents of the corresponding configuration file. In a simplistic embodiment (not depicted), the configuration file fingerprint could consist of an exact or compressed duplicate of the configuration file itself. In such an embodiment, a routine character string comparison could be invoked to determine if the configuration file fingerprint and the configuration file differ. Although this approach has the advantage of simplicity, it would unnecessarily consume valuable memory space to store the duplicated configuration files. In addition, a user who is capable of modifying the configuration file without the authorized configuration file editing tool would likely be able to modify the configuration file fingerprint if the fingerprint was essentially a duplicate of the original file. The embodiment depicted in FIG. 2 contemplates a fingerprint that consumes a fixed and very limited amount of memory yet provides a secure and reliable fingerprint of its associated configuration file. The embodiment depicted in FIG. 2 includes a first configuration file 202*a* and a second configuration file 202*b* (generically or collectively referred to herein as configuration file or files 202). Each configuration file 202 is associated with a corresponding program 203. The programs 203 may represent application programs, operating system programs or portions thereof. It will be appreciated that although programs 203 are depicted in FIG. 2 as contiguous blocks, the programs may reside in discontiguous blocks of the computer system's physical memory. Each configuration file includes a list of configuration parameter names and their associated configuration parameter values. In addition, each fingerprint includes a fingerprint embedded within the configuration file itself. In the depicted embodiment, the configuration file fingerprint comprises the first piece of information in the corresponding configuration file 202. In the preferred embodiment, the size of the configuration file fingerprint is fixed and does not vary with the size of the configuration file. In one such embodiment, the configuration file fingerprint is generated by determining a signature code based on the contents of the configuration file. Any number of suitable signature code, checksum code, or error code can be utilized in the present invention. In the presently preferred embodiment, suitable for its high degree of reliability, the signature code fingerprint is determined using an MD5 algorithm. Other embodiments of the invention may suitably implement, a CRC code, a checksum code, or a SHA type code. FIG. 2 further depicts editing tools 204*a* and 204*b* (editing tool or tools 204) corresponding to each of the configuration files 202. The authorized configuration file editing tools 204 are preferably adapted to update their fingerprint of their corresponding configuration files 202 each time the file is edited or, otherwise modified. Thus, a user wishing to modify a configuration parameter would invoke the appropriate configuration file editing tool. The editing tool may comprise a system tool such as the control panel feature referred to above or may comprise an embedded portion of an application program that is transparent to the user. In any event, the editing tool, after assisting the user with the desired changes, updates the fingerprint to reflect the state of the modified configuration file. In an embodiment in which the fingerprint is generated with an MD5 algorithm, for example, the editing tool would run an MD5 algorithm on the modified configuration file to determine a fingerprint for the file. In an alternative arrangement, each authorized editing tool 204 may simply call a common routine that runs generates the appropriate fingerprint.

The embodiment shown in FIG. 2 further includes a configuration monitor 206. Configuration monitor 206 is invoked in response to encountering a system fault or system error condition to determine whether the system's configuration files are in an authorized state. In one embodiment, configuration monitor 206 includes a catalogue of all configuration files on the system and the current values of their associated fingerprints. For each configuration file 202 identified in the catalogue, configuration monitor 206 verifies that the contents of each configuration file 202 matches the contents indicated by the configuration file fingerprint. In an embodiment utilizing the MD5 or other suitable signature code algorithm, monitor 206 is configured to calculate the signature code for each configuration file listed in its catalogue and compare the calculated finger print value to the fingerprint value saved in the catalogue. If the value in the catalogue and the calculated value differ, the configuration monitor is adapted to indicate the discrepancy thereby informing the user or field service engineer that one or more configuration files have been impermissibly altered. In an alternative embodiment, configuration monitor 206 identifies the configuration files by requiring the configuration files to conform to a uniform naming convention, such as a convention in which all configuration files have a common file name extension. The invention contemplates that further servicing or maintenance of the system will not be performed until the configuration files have been restored to an authorized state. In this manner, it is contemplated that significant improvements and cost reductions in field servicing will result from the invention because the field servicing will not begin until it is known that the software configuration of the system is not the source of the error condition. In the absence of an effective method of determining whether the system configuration files have been impermissibly altered, the manufacturer of the computer system has assurance that a reported problem is not simply a result of improperly modified software settings. By guaranteeing that a field service visit will be initiated for a system only after it has been determined that the software settings are not the source of the problem, the invention contemplates a significant reduction in field service activity and a more effective use of the manufacturer's limited resources.

Figure 3:
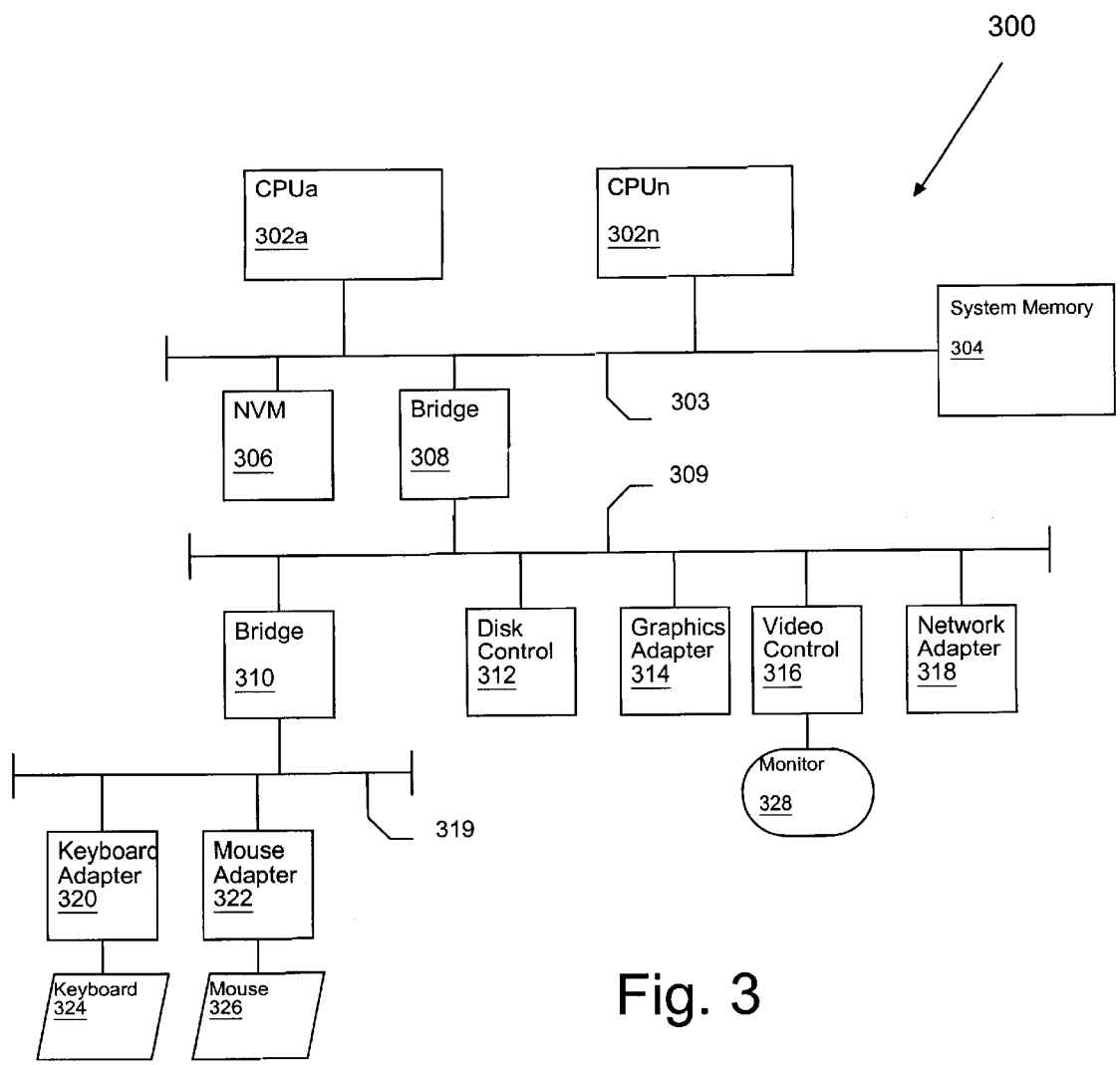
FIG. 3 is a simplified block diagram of a computer system suitable for implementing the software configuration monitor of the present invention.

Turning now to FIG. 3, a computer system 300 according to one embodiment of the invention is depicted. Computer system 300 includes one or more central processing units 302a . . . 302n (CPUs 302) connected via a system bus 303. A system memory 304 is accessible to CPUs 302 via system bus 303 and provides the primary storage area for active programs and data. In various embodiments, the architecture of CPUs 302 may be compliant with any of a variety of commercially distributed architecture families including the RS/6000 family, the Motorola 68000 family, or the Intel x86 family. CPUs 302 are supported by a non-volatile storage device 306 which is encoded with a boot code sequence suitable for restoring computer system 300 to a functional state after a system reset. In addition, non-volatile storage device 306 may include microcode such as a Basic Input-Output System (BIOS) suitable for providing an interface to the system's I/O facilities including hard disks, floppy disk drives, and compact disc drives. A first bridge 308 provides an interface between system bus 303 and a first I/O peripheral bus 309. First I/O bus 309 is preferably compliant with any of a variety of industry standard bus architectures including the PCI, AGP, MCA, ISA, and EISA architectures. In a presently preferred embodiment suitable for its high speed and the wide of availability of compatible I/O devices, first I/O bus 309 is compliant with the PCI Local Bus Specification Rev 2.2 available from the Internet at www-.pcisig.com. In the depicted embodiment, various I/O devices such as disk controller 312, graphics adapter 314, video controller 316, and high speed network adapter 318 are all coupled to first I/O bus 309. While graphics adapter 314 and video controller 316 are indicated as distinct units in FIG. 3, it will be appreciated that video controller 316 may be integrated into graphics adapter 314. Video controller 316 is suitable for refreshing the display monitor 328 with an image storage in a frame buffer (not depicted).

Computer 300, as depicted in the embodiment of FIG. 2, includes a second bridge 310 coupled between first I/O bus 309 and second I/O bus 319. Second I/O bus may provide facilities for devices that are compatible with a different bus architecture than the devices coupled to first I/O bus 319. In one embodiment, second I/O bus 319 is an ISA bus and provides a path between less demanding devices such as a keyboard and a mouse and system bus 303. As depicted, a keyboard adapter 320 and mouse adapter 322 are coupled to second I/O bus 319. The functions supported by these adapters may be integrated into a single device such as a super I/O device that provides facilities for a variety of I/O devices in a single package.

In one implementation, the present invention comprises a set of instructions in a storage facility of computer 300. The set of instructions, or at least a portion thereof, is typically stored system memory 304 when being executed by CPUs 302 of computer system 300. When not being executed, the set of instructions may reside in a different storage facility including, as examples, a hard disk coupled to disk control 312, a floppy disk, or a CD. The instructions are suitable for carrying out the method of monitoring the software configuration of system 300 are described previously with respect to FIG. 1 and FIG. 2.

It will be apparent to those skilled in the art having the benefit of this disclosure that the present invention contemplates the ability to detect unauthorized modifications made to computer system configuration files and to enforce the use of authorized configuration files. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of monitoring the configuration of a computer system, comprising:

as a preliminary step in an error recovery procedure, determining whether each of a set of configuration files, each file containing configuration parameters values for a corresponding executable program of the computer system, is in an unauthorized state by comparing a configuration file signature indicative of the contents of the configuration file to a signature in a corresponding entry of a configuration file catalogue, the catalogue containing a signature for a plurality of the set of configuration files; and responsive to determining that at least one configuration file is in an unauthorized state, restoring the configuration file to an authorized state before proceeding with the error recovery procedure.

2. The method of claim 1, further comprising, storing a configuration file fingerprint indicative of the contents of the configuration file in the configuration file.

3. The method of claim 2, further comprising, providing an authorized tool corresponding to each executable program for modifying the corresponding configuration file, wherein the tool updates the appropriate catalogue fingerprint upon modifying the configuration file to reflect the modified contents of the configuration file.

4. The method of claim 2, wherein the step of storing the fingerprints with the configuration file comprises determining a signature code for the configuration file based on the contents of the configuration file.

5. The method of claim 4, wherein the signature code is generated using an algorithm selected from the group consisting of checksum, CRC, MD5, and SHA algorithms.

6. The method of claim 1, wherein the configuration file is maintained in an authorized state if the file is edited using an authorized configuration file editing tool.

7. The method of claim 1, wherein the configuration file is a system configuration file associated with the computer system's operating system software.

8. The method of claim 1, wherein the configuration file is associated with an application program.

9. The method of claim 1, wherein the step of determining whether the configuration file is in an unauthorized state includes is accomplished by a configuration monitor that is invoked in response to detecting the error condition.

10. The method of claim 1, wherein the configuration monitor includes a catalogue of each configuration file of the computer system and wherein the monitor verifies the authorized state of each configuration file in the catalogue.

11. A computer system including processor, memory, input device, and display device, the computer system comprising:
- a set of application or operating system programs, each stored at least partially in the computer system memory;
- a set of configuration files stored in the computer system memory, wherein each of the configuration files contains values for configuration parameters of the corresponding programs and a fingerprint determined by the corresponding configuration file parameter values;
- a configuration file catalogue containing an entry for each of the set of configuration files, each catalogue entry including an authorized fingerprint indicative of authorized parameter values in the corresponding configuration file;
- means for using the catalogue fingerprint to determine whether the parameter values of each configuration file are in an authorized state.

12. A The computer system of claim 11, wherein the determining means include;
- means for generating a configuration file signature code indicative of the contents of the corresponding configuration file; and
- means for comparing the configuration file signature code with the corresponding catalogue, fingerprint.

13. The computer system of claim 12, wherein the means for generating the signature code includes a signature code generation algorithm selected from the group consisting of MD5, CRC, SHA, and checksum algorithms.

14. The computer system of claim 11, further comprising a set of editing tools corresponding to each program, wherein each editing tool is configured to permit a user to alter configuration parameter values while maintaining the corresponding configuration file in an authorized state.

15. The computer system of claim 14, wherein the each editing tool is configured to re-compute the corresponding configuration file signature and to update the catalogue with the re-computed signature.

16. A computer program product comprising a computer readable medium containing computer executable program code means embodied therein for monitoring the configuration of a computer system, said computer readable program code means including:
- a set of executable programs, each stored at least partially in the computer system memory;
- a set of configuration files stored in the computer system memory, wherein each of the configuration file contains values for configuration parameters of the corresponding executable program and a fingerprint determined by the corresponding configuration file parameter values;
- a configuration file catalogue containing an entry for each of the set of configuration files, each catalogue entry including an authorized fingerprint indicative of authorized parameter values in the corresponding configuration file; and
- computer code means for using the catalogue fingerprint to determine whether the parameter values of each configuration file are in an authorized state.

17. The computer program product of claim 16, further comprising means for generating each configuration file fingerprint using a signature algorithm selected from the group consisting of MD5, CRC, SHA, and checksum algorithms.

18. The computer program product of claim 16, further comprising a set of authorized means for modifying the contents of each configuration file, wherein modifying a configuration file via the corresponding authorized means leaves the modified configuration file in an authorized state.

19. The computer program product of claim 18, wherein the authorized means includes means for updating the authorized fingerprint associated with the configurations file.

20. The computer program product of claim 16, further comprising, code means, responsive to determining that the configuration file is not in an authorized state, for suspending an error recovery procedure initiated in response to a computer system error condition until the signature file has been restored to an authorized state.

* * * * *